Patented Aug. 8, 1944

2,355,178

UNITED STATES PATENT OFFICE 2,355,178

APPARATUS FOR MINING, LOADING, AND CONVEYING MATERIAL

Richard Peale, Clearfield, Pa., and Rembrandt Peale, Jr., Greenwich, Conn.

Application April 4, 1942, Serial No. 437,718

1 Claim. (Cl. 262—9)

The invention relates to mining and more particularly to a novel and useful method of mining, loading and conveying coal together with apparatus for performing said method.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Objects of the invention are to provide a novel method of mining material such as coal wherein a kerf is first cut horizontally in the seam of material either at the top or bottom thereof, the portion of the seam which is cut then being "shot-down" in place by explosive and thereafter excavated or "loaded out" and the loaded material conveyed to the entry for disposal in cars or other receptacles. In accordance with the invention, the step of cutting the next kerf in the solid face of coal is performed simultaneously with the loading out of the coal shot-down from the preceding cut. That is, the invention provides the novel method of simultaneously loading out a shot-down face of coal while cutting a new kerf ahead of or beyond that shot-down face so that the loading out of one area or zone of coal is performed concurrently with making the cut for the next advanced zone. This novel method very greatly reduces the time required in the normal cycle of cutting, shooting and loading. For the performance of this novel method we provide a novel combination of mining, loading and conveying apparatus wherein the mining or kerf-cutting machine has combined with it apparatus for performing the loading and conveying operations. These latter operations may be performed when the kerf-cutting machine is in situ and preferably while it is operating to make the next advanced cut. Moreover, said cutting machine is provided with devices whereby the structure of the machine itself cooperates and functions with the loading and conveying mechanism. Hence a relatively small space is required for the loading mechanism over and above that occupied by the cutting machine itself, while the devices for providing locomotion of the cutting machine from one place to another are also available for positioning it for the loading and conveying operations.

Another object of the invention is to economize on space underground. That is, the combination of loading equipment with the structure of the cutting machine avoids the necessity of having separate pieces of equipment, while the novel method of using same simultaneously avoids the necessity of having to withdraw and lodge the cutting machine in an unoccupied space in the mine while the loading equipment is in operation and vice-versa.

In mining operations as formerly practiced, the cutting machine first moves across the solid coal face to cut the kerf. It is then withdrawn and the over-cut or under-cut coal shot down. Thereafter the shot-down coal is loaded out either by mechanical loading mechanism and conveyers or by hand. Where mechanical loaders are used, they must be brought up to the shot-down face from some idle position in the mine for that purpose while the temporarily idle cutting machine must be withdrawn and stationed elsewhere. Hence there is frequent withdrawing of active machines into an idle condition and interchange thereof at different stages of the mining and loading cycle. These interchanges of machines and alternately spacing same in idle position requires much additional space in the mine, thereby preventing close timbering and also requiring considerable additional time and labor in order to move machines from their idle to their active positions and vice-versa. It is sometimes necessary to cut out an extra space in the coal rib to accommodate the idle machine, as when driving a cross-cut or other narrow place. All this lost time and motion are eliminated by the invention and the space formerly required to be left available for positioning the idle machine or machines may be timbered up as the mining operation proceeds.

In consequence it will be understood that our novel mining method and apparatus very greatly increase the rapidity and efficiency of the mining operations and thereby increase the amount of coal delivered from a given place in the mine within a given time. The invention also greatly reduces the expense of the initial equipment required because of the combination of several functions into a single machine.

Another object of the invention is to provide a single machine which simultaneously or concurrently is capable of cutting kerfs in a coal seam, loading the shot-down coal from the seam face or place and also conveying the loaded coal to any desired remote point or receptacle in the mine. The loading and conveying apparatus employed with the invention is capable of indefinite extension so as to deliver its load at any desired point in the mine and to convey same through and around corners and along passages of any required length and complexity. Thus the loading and conveying functions accompany and cooperate with the kerf-cutting operations of the apparatus regardless of how remote the working face may be from the mine car entry.

In general the apparatus embodying our invention comprises a kerf-cutting machine of conventional type having a cutter bar with an endless cutting chain thereon which in the preferred form is adapted to extend horizontally from the top of the machine and cut a kerf at the top of the vein or seam of coal. Attached to and built into the base structure of such mining machine we provide a circular guiding and bearing platform for cooperating with a concentrically movable curved skip employing the principles of operation and construction disclosed in our copending application filed March 10, 1942, Serial No. 434,070. The usual drum driven cables are provided for affording locomotion to the cutting machine base, although preferably we provide additional guiding means on said base so that greater angular and directional movement can be imparted to the machine from any setting of the cable jacks. The size and height of the skip and the position of the circular guiding platform on the machine are preferably such that the skip is adapted to travel about the base of the cutting machine and beneath the overhanging cutter bar so that the skip can travel relative to the cutter bar and beneath same without either interfering with the functions of the other.

Figures 1, 3:
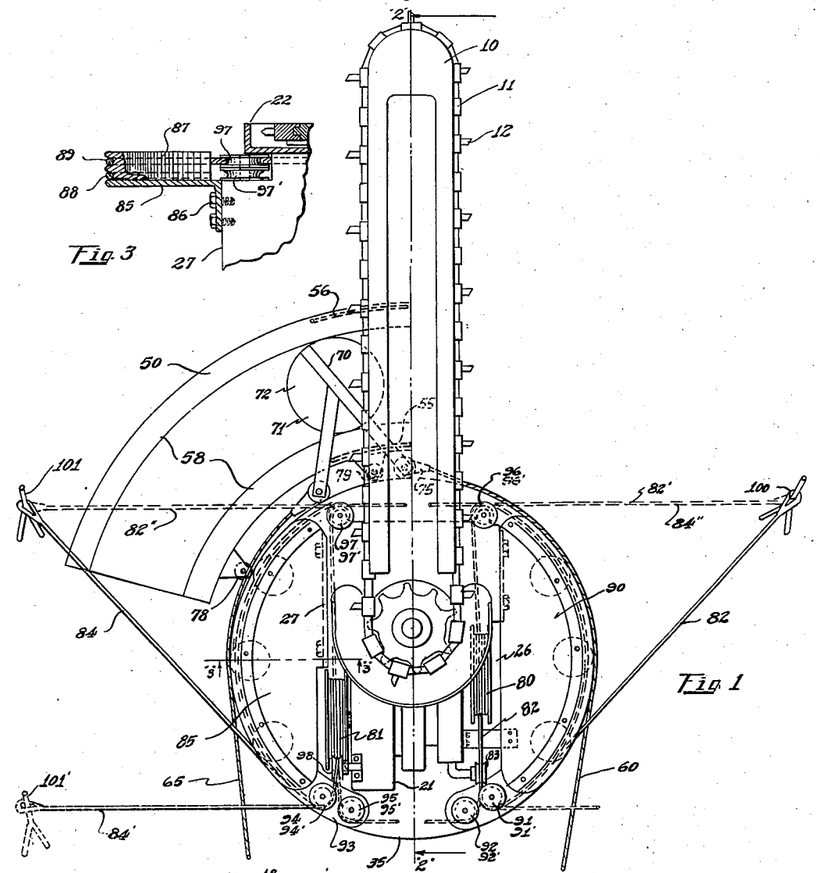
Fig. 1 is a top plan view of apparatus embodying the invention and to be used in performing the novel method thereof.
Fig. 3 is a fragmentary enlarged detail in section taken on line 3—3 of Fig. 1.
Figure 2:
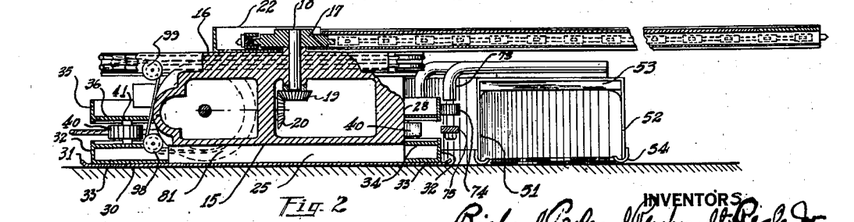
Fig. 2 is a longitudinal vertical section on line 2—2 of Fig. 1.

It will be understood that the foregoing general description and the following detailed description as well are exemplary and explanatory but are not restrictive of the invention. Referring now in detail to the present preferred embodiment of the invention illustrated by way of example in the accompanying drawings, a generally conventional short wall kerf-cutting machine having an elevated horizontally-disposed endless chain, cutter bar is shown in Figs. 1 and 2. As shown, said machine comprises the elongated cutter bar frame 10 about which travels the endless chain 11 having cutting bits 12 thereon. The construction of this mechanism is conventional and constitutes of itself no novel feature of the invention.

However, in accordance with one feature of the invention said cutter bar is preferably somewhat longer than is customary for making the normal depth of kerf in short wall mining operations in thin seam coal. The depth of kerf cut in coal depends somewhat on the thickness of the seam and in thin seam mines having seams of 30" or less thickness, the normal kerf is usually about 5½' or 6' in depth, i. e. distance from the face to the back of the kerf at the end of the cutter bar. In practicing the present invention it is desirable to have the cutter bar 10 of substantially greater length, preferably having an overhang from its base of some 10' or 11' so that the extended portion thereof may be used to cut a kerf in the solid wall beyond the pile of shot-down coal while the latter is being loaded out.

In accordance with the invention, the cutter bar frame 10 is preferably mounted on a machine frame 15 so as to project horizontally from the top thereof in cantilever fashion. Said frame 15 in general is conventional in construction and as shown has an upper flat table surface 16 on which the inner end portion of the cutter bar frame 10 is adapted to rest. A horizontally rotatable sprocket wheel 17 is mounted on top of said table 16 for driving the cutting chain 11, said sprocket wheel being driven by vertical shaft 18 which is journaled in and extends downwardly through the top portion of the frame 15 and has a bevel gear 19 on its lower end. Said gear is driven by a bevel pinion 20 from a motor 21 by any suitable conventional drive reduction means. The rear portion of the sprocket wheel and chain are surrounded by a crescent-shaped guard member 22 having a flat base portion and an upstanding flange. Suitable controls, not shown, are provided for clutching and declutching the cutting chain drive from the motor as desired.

Means are provided for using the frame structure 15 of the cutting machine as a base and foundation for loading equipment whereby loading and conveying away of shot-down coal may be effected about the base of said machine and wherein same acts as a guiding and lateral bearing support for the loading skip. This mechanism, including the skip, the guiding and bearing surfaces and their cooperating means, is constructed and designed to operate substantially as shown and described in our copending application Serial No. 434,070, filed March 10, 1942. As shown, the base frame 15 of the mining machine is generally rectangular in shape, having a flat rectangular base portion 25, vertical side walls 26 and 27 and vertical front end wall 28.

A circular flat base plate 30 is designed to underlie and be fixed to the bottom 25 of machine base 15, the periphery of said plate 30 being provided with an upwardly-inclined lip 31 to serve as a guide and deflector for broken material on the mine floor. Projecting upwardly from said base plate 30, there is provided an annular vertical bearing wall 32 designed to give lateral bearing support to bearing rollers on the skip. Said vertical wall 32 is attached to the base plate 30 by means of a bottom frame plate 33 which is shaped to fit around and against the external border of the rectangular base 25 of the machine base 15. Said plate 33 is preferably welded or otherwise suitably fixed to the base plate 30. Spaced above and parallel to said plate 33 is an annular strengthening web 34. An upper vertical bearing wall 35 is spaced above the lower wall 32 and is concentric therewith and of the same external diameter. Said wall 35 is similarly spaced about and attached to an elevated portion of the external walls of the machine base 15 by means of a horizontal web 36 which projects inwardly from said wall 35 and is fixed to the base 15 in any suitable manner. Cable-engaging sheaves or rollers 40 are mounted between the upper wall 35 and the lower wall 32 so that the external periphery of said rollers lies on the surface of the cylinder defined by the peripheral surfaces of the walls 32 and 35. The space between said walls 32 and 35 is otherwise unoccupied. The rollers 40 are substantially uniformly spaced about the cylindrical surface between the walls 32 and 35 and are mounted on vertical axles 41, the upper ends of which are journaled in the web 36 and the lower ends in the web 34. Thus it will be recognized that the lower portion of the base of the cutting machine is surrounded and encompassed by cylindrical bearing surfaces 32 and 35 having between them a plurality of sheaves or rollers for cooperation with the bearing members of the skip 50 and the head rope 60 and tail rope 65 respectively, it being understood that the rollers 40 provide bearing support for guidance for said ropes.

The skip 50 is shown somewhat diagrammatically, representing one form of skip for cooperating with the circular guiding and bearing platform. Several forms of such skip are fully shown and described in our copending application Serial No. 434,070 and it will be understood that any form of said skip may be used in connection with the present invention and in cooperation with the guiding and bearing platform comprising the base 30, circular walls 32 and 35 and the intermediate rollers 40, all formed as a circular attachment about the base of the cutting machine as hereinabove described. In general the skip as shown herein comprises an arcuate inner vertical side wall 51, a concentric vertical outer wall 52 with connecting horizontal end frame members 53. The bottom of said skip is open, while the side walls are preferably mounted on curved members 54 forming runners or skids for movement of the skip along the mine floor. At least one end of the skip is provided with pivoted doors 55 and 56 which in their open position lie parallel and against the inner and outer side walls respectively, but which may be drawn together about their pivots so that their free ends touch to close the skip after same has been loaded with coal. The skip is provided with at least one pair of divergent arms 70 and 71 which extend horizontally across the top of the skip and are mounted to turn horizontally with a turn table 72. Said arms are fixed with respect to each other and extend horizontally from said turn table. Each arm is provided with a vertically-depending end portion 73 on which is mounted a horizontally rotatable roller 74 which is adapted to engage and bear against the vertical bearing surface 35 of the guiding and bearing platform. A suitable rope-connecting clamp 75 is formed at the lower end of the arm 73 to which the head rope 60 is attached. The tail rope 65 is attached by similar means at the lower end of the divergent arm 71.

Figure 4:
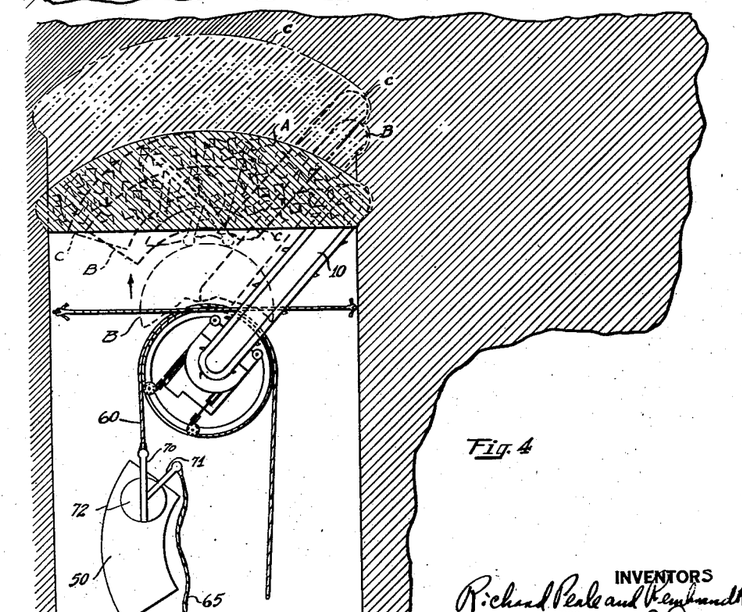
Fig. 4 is a diagrammatic plan view of one mining operation employing the invention.

As stated, said arms are rotatable together with the turn table 72 and are movable into the positions shown in Figs. 1 and 2 upon contact with the circular guiding and bearing surface 35 of the circular platform. The arms are rotatable together from said position to one in which the arm 70 extends axially of the skip and in front of the end thereof when the skip is not in contact with such platform, as shown in Fig. 4 for example. Thus the divergent arms 70 and 71 afford means for easing and guiding the skip into concentric conformity with the periphery of the circular platform when drawn toward and against same by the pull of the head rope 60. When the skip is being pulled toward said platform (Fig. 4), the divergent arm 71 and its roller 74 first encounter the curved surface 35 of said platform. This contact causes the arm 71 to turn the turn table 72 and thereby rock the arm 70 toward and into contact with the circular wall 35 so that the rollers on the two arms take up the shock of impact and simultaneously turn with the turn table so as to guide and ease the skip around and into concentric relation with the circular platform. When the skip has so been brought into concentric bearing relation with the platform, the arms 70 and 71 will be in the position shown in Fig. 1. Bearing rollers 78 and 79 are mounted at a lower level on the inner wall 51 of the skip so that they bear against the lower circular wall 32 of the platform when the skip is in such concentric bearing relation to said platform. Thereafter pull on the head rope 60 will cause the skip to travel in a circular path or orbit about said circular platform while exerting lateral bearing thrust thereagainst, and the skip will continue so to travel in the direction of pull of the head rope until said pull is relaxed.

Thereafter, upon exerting reverse pull upon the tail rope 65, the arm 71, together with arm 70 and the turn table 72, will be drawn toward the tail end of the skip, travelling along the top thereof in arcuate-supporting trackways 58 until they reach a position corresponding to that shown in Fig. 1 at the opposite end of the skip. As disclosed in our copending application Serial No. 434,070 such sliding movement of the turn table 72 effects a closing of the doors 55 and 56 when the turn table performs the final portion of said sliding movement.

When the closing of the doors has thus been accomplished, continued pull on the tail rope will draw the skip around the circular platform in the reverse direction over the path on which it travelled due to the pull of the head rope. The skip is thus drawn away from concentricity with the platform and as it so travels, the arm 71 will swing around into line with the tail rope and thus pull the skip in a straight line along the floor of the mine to the ramp at the entry or other place of unloading. By again reversing the direction of pull, the head rope will draw the arms 70 and 71 and the turn table 72 toward the head end of the skip and thereby cause the doors 55 and 56 to reopen. Then the skip will be withdrawn leaving its load of coal behind it and the skip will be returned into concentric relation again with the circular platform 30 about the base of the cutting machine as previously described.

Thus it will be clear that by successively moving the skip in such manner about the circular base or platform around the cutting machine base, any shot-down coal lying within the orbit of the skip about said circular platform 30 will be loaded and conveyed away. It will be noted that the height of the skip 50 and its superstructure, comprising the arms 70 and 71, is such that they may always pass beneath the overhanging cutter bar 10 and its attached mechanism with substantial clearance therebetween (Fig. 2). Hence the skip may travel about the base of the cutting machine and load coal in its orbit without any interference with the positioning and operation of the cutter bar and chain. By virtue of this arrangement it is therefore possible to load out shot-down coal about the base of the cutting machine while at the same time operating the cutting chain to cut a kerf in solid coal lying within reach of the cutter bar. Thus the skip may be moved in and around the circular platform on the cutting machine regardless of whether or not the latter is simultaneously operating to cut a kerf and also regardless of whether or not it is stationary or is moving across the mine floor during the making of a transverse cut.

The invention provides means for imparting travelling movement to the cutting machine and the circular platform thereabout so as to move same over the mine floor in any desired direction, either forwardly or rearwardly or laterally in either direction and also to impart rotational or angular movement to the machine about its base so as to be able to swing the cutter bar in an arcuate path. For this purpose we preferably employ a novel and simple system of drum-driven ropes and jacks. As shown in Figs. 1 and 2, a rope drum 80 is mounted on the cutting machine frame to rotate on a horizontal axis and be driven from the motor 21 in known manner. That is, said drum is designed to be driven in either sense of rotation and also to be held stationary when desired. A similar drum or reel 81 is similarly mounted at the opposite side of the frame 15 of the machine base to operate another rope in similar manner. If desired, however, said second drum 81 may not be driven but may merely be controlled by a brake. Said drums are commonly so provided on conventional cutting machines and no substantial change in their construction and arrangement is necessary for the purposes of the invention.

However, the invention provides means for guiding the ropes which are attached to said drums or reels so as to impart the various sorts of travelling and angular movement to the cutting machine as previously stated. For this purpose rope 82, mounted to rotate on a horizontal axis at a level just below the top of table 16 of the cutting machine frame. From said pulley the rope 82 may be directed in a horizontal plane in any of several directions depending upon the type of movement desired to be imparted to the cutting machine. For this purpose (Fig. 3) a segmental bracket comprising a horizontal plate 85 having an arcuate outer edge is attached to the vertical side 27 of the frame 15 by a depending flange 86. The outer edge of said bracket plate 85 is upturned to provide an arcuate vertical wall 87 which is grooved at two levels 88 and 89 to provide upper and lower guide grooves for the ropes from the drums 80 and 81. A similar segmental grooved rope-guiding bracket 90 is provided along the opposite side wall 26 of the base 15.

Horizontally rotatable rope-guiding pulleys or sheaves are provided at either end of the two segments 85 and 90 so as to guide the ropes from the drums 80 and 81 in any desired direction. As embodied grooved independently rotatable double pulleys 91, 91' are mounted just beyond the rear end of the segment 90 and similar double pulleys 92, 92' are spaced therefrom. Both pairs of said pulleys are supported on vertical axes mounted on an arcuate-supporting plate extending in prolongation of the curve of the periphery of the segment 90 toward the rear of the machine. A similar curved supporting plate 93 extends from the rear end of the segment 85 and supports the two spaced double, independently rotatable horizontal pulleys 94, 94' and 95, 95'. At the opposite or front end of the segment 85 there is mounted a pair of independently rotatable grooved pulleys 97 and 97' on the same axle, supported on a bracket extending from the top of the frame 15 of the machine. A similar pair of pulleys 96 and 96' is mounted on the opposite side of the cutter bar frame beyond the front end of the segment 85.

By means of the above-described guide pulleys and grooved arcuate frames, we are enabled to direct the ropes 82 and 84 from the drums 80 and 81 respectively, in substantially any desired direction or combination of directions to effect the desired movements of the cutting machine. As the ropes 82 and 84 are shown in solid lines in Fig. 1, same are positioned to effect a forward movement of the machine in line with the cutter bar, as for advancing the machine into a coal face for sumping same to start a cut or merely to advance the machine toward a wall in a forward direction. For this purpose the rope 82 is passed over the elevated pulley 83 and thence around pulley 91 and along the groove 88 of the segmental guide 90 and tangentially to be anchored to a suitable jack 100 which is positioned toward the side and front of the machine base. Said jack may be of any suitable construction but preferably, and as shown, is the simple hand type of rail jack set in the floor and roof. In similar manner the rope 84 is led from drum 81 under a pulley 98 at the lower level of the machine and thence upwardly and over a similar vertical pulley 99 and thence around pulley 94 to jack 101 which is anchored in a similar and opposite spot to that of the jack 100. It will be seen that by winding up simultaneously on both drums 80 and 81 the entire cutting machine including its circular guiding platform will be advanced forwardly in the direction of the axis of the cutter bar, the base plate 30 of said platform sliding along the mine floor.

Figure 5:
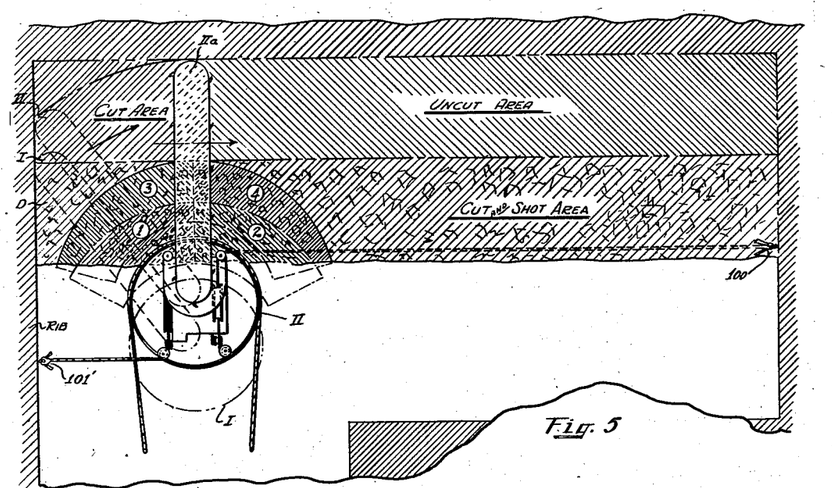
Fig. 5 is a similar diagrammatic view showing the invention applied to the cutting and loading out of a room face.

If it be desired to move the cutting machine laterally (i. e. at right angles to the forward or axial direction of the cutter bar), while maintaining the cutter bar in the forward direction, the jacks 100 and 101 and the ropes 82 and 84 will be positioned as shown in Fig. 5 for example. That is, rope 84 will be in the position 84' and jack 101 will be in the position 101'. Rope 82 will be directed over the top of drum 80 and thence forwardly around sheave 96 and thence to the right along line 82' to jack 100. It will be clear that by taking up on drum 80 and paying out from drum 81 the machine and its cutter bar will be moved toward the right in a straight line, thereby making it possible to make a transverse or lateral cut as shown for example in Fig. 5. In a similar manner the machine may be moved toward the left by opposite arrangements of the respective ropes and jacks as will be obvious. Such arrangement would be made for example when the machine is drawn back after the end of a cut or when it is desired to cut crosswise in the opposite direction, i. e. by movement toward the left.

Figure 7:
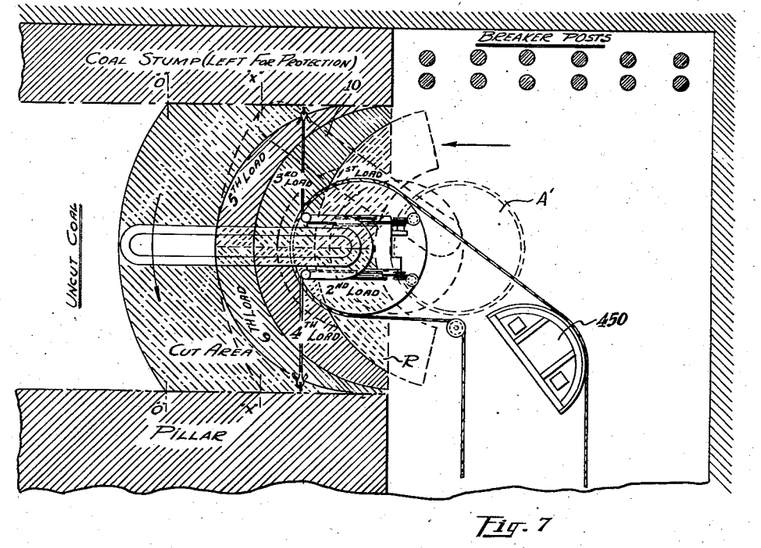
Fig. 7 is a similar view showing the operation of cutting out or withdrawing a pillar.

The above-described mechanism also makes it possible to rotate the machine on its own circular base plate 30 and thereby to impart any desired or arcuate movement to the cutting machine and to the projecting cutting bar 10. The disposition of the ropes 82 and 84 for such angular movement is indicated in Fig. 4 for example. For this purpose the jacks 100 and 101 are disposed opposite each other on a line tangent to the forward edge of the machine base, that is, substantially in the position shown in Fig. 1. Rope 82 is then reeved around pulley 91, thence around the arcuate periphery of rope-guiding segment 90, across pulley 96 and pulley 97 and then along line 82" to jack 101. Rope 84 is similarly reeved around pulley 94 and the guiding periphery of arcuate segment 85, thence across pulleys 97 and 96 and made fast to jack 100, thus passing along the line 84". Then, by taking up on rope 84 and paying out on rope 82, it will be clear that the entire cutting machine will be rotated on its base plate 30 on the mine floor so as to swing in a clockwise arc to make an arcuate movement or cut as indicated in Figs. 4, 5 and 7 for example.

By taking up on rope 82" and paying out on rope 84", reeved in the directions described above, it will be understood that the cutter bar and cutting machine may be similarly rotated in the opposite sense, as for example counter-clockwise from the position shown in Fig. 4.

When only one drum, say drum 80, is motor-driven, angular rotation of the machine may be had by use of the pulleys 92, 92' and 95, 95'. To turn the cutter clockwise rope 82 is reeved about pulley 92, then about pulleys 95, 94 and groove 89 of segment 85 and thence around pulleys 97 and 96 to jack 100. Rope 84 passes around pulleys 95', 92', 91', lower groove of segment 90, pulleys 96' and 97' to jack 101. By taking up on drum 80 and paying out on drum 81 the machine is given the desired clockwise rotation. By other similar rope threadings a counter-clockwise rotation may be obtained when only drum 80 is powered and drum 81 controlled by brake.

Fig. 4 illustrates application of the invention to the driving and loading of an entry or narrow place such as the neck of a room. In the initial position of the apparatus, a mass of coal has been shot down from the arcuate kerf A which was cut in the coal by the cutter bar operating from the machine, when positioned as shown in full lines. During this initial cutting operation only, the skip 50 is maintained idle to the rear of the cutting machine along the rope line in its normal path of movement. After the first kerf A has been cut the coal is shot down, the cutting machine being left in the initial position shown or, if desired, slightly retracted during the shooting operation.

The next operation is to advance the cutting machine forwardly so as to sump the end of the cutter bar into the solid coal at the right-hand side of the entry. This movement brings the end of the cutter bar into the position B so that the circular base platform thereof occupies an advanced position B in the place. In that position the skip 50 may be advanced into contact with the circular platform to load the coal in its path about said platform in the manner fully described in our copending application Serial No. 434,070. On its first inward movement the skip 50 will occupy the position B as indicated, thereby loading out the segment of coal defined by the outline of the skip in the position B as shown. The skip is then withdrawn in the reverse direction by the tail rope, its end doors closing so that it takes the coal with it out along the rope line to the mine entry for delivery. On its next trip the skip proceeds further about the base of the cutting machine in position B to load out the remainder of coal within its ambit in that position. As will be understood, in making this second movement to load in the position B, the skip will pass under the overhanging sumped-in cutter bar 10 and will withdraw from beneath it to unload. When so sumped-in, the cutter bar contributes to the steadiness of the machine during the loading movements of the skip about its base.

The cutting machine is then advanced so that its base occupies the peripheral outline C and the end of its cutter bar is sumped to the position C as indicated. While in this position the skip 50 is moved to load out substantially all the remaining coal in the shot-down mass, the skip occupying the arcuate position C on its first trip and clearing up the remainder of the shot-down mass on its second trip as will be obvious. During the loading operations while the cutting machine base is in the position C, the cutter bar is free to move arcuately to the left, thus cutting a new kerf on the arc C in the solid face of coal beyond the arc wall A. This cutting and arcuate sweeping movement of the cutter bar 10 may be performed while the skip is travelling rearwardly on its unloading movement and returning to the face for its next load, but the cutting and swinging movements of the bar need not necessarily be stopped even during the time when the skip is in loading contact with the circular base platform and moving beneath the cutter bar. That is, the cutter bar and the circular platform may be swinging to the left or counter-clockwise about the center of said platform in position C while at the same time the skip is travelling clockwise along said circular platform to load the coal underlying that portion of the cutter bar extending across the shot-down area.

Fig. 5 illustrates operations of the invention in beginning simultaneous loading and cutting across the straight face of a room. That is, after the room neck has been driven as shown in Fig. 4, a wider place is opened up to form a room and in thin seam mining the width of such a room may be approximately 40 ft. at most, while in the usual mining practice according to the "room and pillar" system, the width of the rooms is more commonly about 20 or 25 ft. in thin seam mines, and in many seams of greater thicknesses, (i. e. 5 or 6 ft. thick), the room width may be about 15 to 18 ft. Fig. 5 shows the operation of advancing such a room with the mechanism in starting position to load the shot-down area and cut the adjacent uncut area concurrently. As shown in this view, it will be assumed that the zone or area marked "cut and shot area" has already been cut by transverse passage of the cutting machine and the coal so cut has been shot down and is ready for loading out. For the latter operation, the combined cutting and loading machine is first advanced to the position marked "I." In that position, the end of the cutter bar extends through the kerf above the shot-down coal and is sumped a short distance into the uncut or solid area of coal beyond at the point marked "I." With the circular platform and cutter bar of the machine in these positions I, the skip may be moved to load out the coal in the dotted area I and after conveying that load to the entry the skip will return and load out the remaining mass of coal in the arcuate zone or area 2. Having thus cleared a portion of the shot-down coal in the path of the machine, the latter may then be advanced to the position II shown in solid lines. From its initial position the cutter bar moves forwardly along the rib of the room to the left-hand position II as shown. In that position the cutter bar is capable of being moved on an arc to the right as indicated by the arcuate arrow and this cutting movement is performed with the base of the machine in the position II until the cutter bar has reached the straight ahead position IIa. Thus it has cut an arcuate kerf having a final width at IIa substantially equal to that of the original kerf in the shot-down area.

While the circular platform of the machine is in the position II and is cutting out the arcuate kerf just described, the coal in the areas 3 and 4 may be loaded out by loading movements of the skip about the circular platform in the manner already disclosed. It will be understood that in loading out all of these zones 1, 2, 3 and 4, some or all of the skip will pass under the overhanging cutter bar and this operation may take place either while the cutter bar is in its stationary position IIa or while it is cutting and moving toward that position in the manner previously described. The roughly triangular area D will ordinarily be left unloaded to save time and operations although a portion of it could be loaded out by moving the machine somewhat to the left from position II if this were desired.

Figure 6:
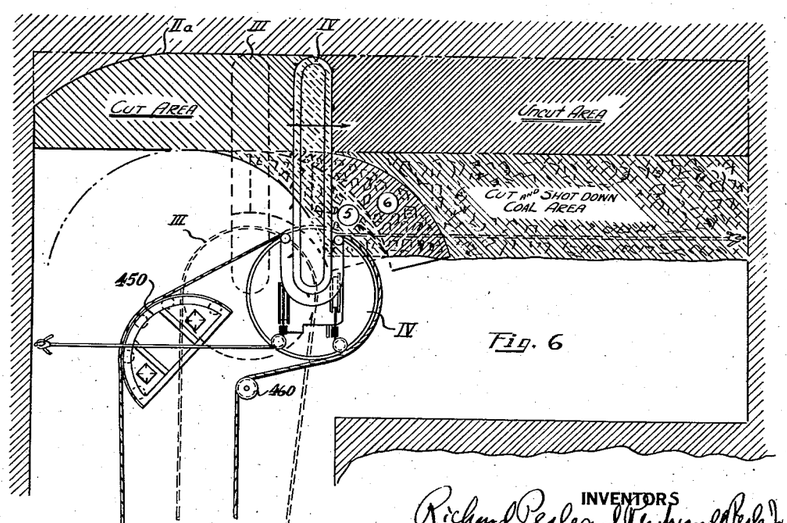
Fig. 6 is a view similar to Fig. 5 showing the apparatus at a more advanced point in the same operation.

Fig. 6 illustrates subsequent operations in loading and cutting the coal across the face of the room from the positions shown and described in connection with Fig. 5. In the operation shown in Fig. 6 the combined cutting and loading machine is moved progressively, by the jack-fastened cables, toward the right in a straight line parallel to the face of the room and by such movements the coal in the shot-down area is progressively loaded out while the kerf is progressively advanced into the uncut or solid area beyond by the projecting cutter bar. In order to permit loading during this lateral or right-hand movement of the machine, we preferably employ the semi-circular platform 450 to act as a directional guide and support for the skip tail rope and the skip in converting the direction of movement of the skip from straight forward to the lateral. The construction and specific operation of said semi-circular platform are fully described and shown in our copending application Serial No. 434,070 and need not be repeated here. Also a simple directional sheave 460 is positioned opposite the semi-circular platform 450 to maintain the parallel spacing of the skip head rope from its tail rope.

In the dotted-line position III of the circular platform and of the cutter bar it will be seen that the segmental area 5 of shot-down coal may be loaded out by the skip while a straight kerf cut parallel to the face of the coal is concurrently made by the movement of the cutter bar from the position IIa to the position III. The machine is then advanced to the next right-hand position IV and this is done by a simple rectilinear movement to the right by the entire circular platform, cutting machine and cutter bar, thus bringing the end of the cutter bar into the position IV as shown and thereby further advancing the straight kerf from the line III to the line IV. While so moving the platform to the right the skip can continue to perform its loading and conveying movements. From position IV the skip can load out a complete arcuate area 6 by simply moving in, clockwise, about the circular platform in position IV and retreating in the usual manner.

It will be understood that the circular platform is capable of advancing across the room at any time when a path has been cleared before it in the shot-down coal by the loading action of the skip. Thus the circular platform and cutting machine to which it is attached may be moving at the same time that the skip is travelling about it to load and to unload. For example, in Fig. 6, the platform may be started moving to the right just as soon as the skip has withdrawn about it with its load far enough to leave a cleared path through the shot-down coal tangent to the inner edge of the platform. When the travel of the skip is sufficiently short, the skip may be moved back into the pile of shot-down coal while the platform is still travelling to the right. In other words, locomotion of the platform and cutting machine over the mine floor is no impediment to loading action of the skip and such loading and unloading movements of the skip may frequently take place during locomotion of the platform.

Thus it will be seen that the bulk of the coal shot-down in the room of Figs. 5 and 6 can be loaded out by progressive straight-line advancing movements of the machine. As the machine advances, arcuate bites of shot-down coal are loaded out of the shot-down area while concurrently the kerf in the uncut area just beyond is advanced by the amount of the lateral advance of the machine.

When the entire mass of coal in the shot-down area has been loaded out by progressive movement of the machine across the face of the room, the kerf for the next advanced face will have been fully cut. The next step in the cycle is therefore that of drilling the explosive holes and shooting down this freshly cut area. For this operation the machine will preferably be left standing in place at the right-hand end of the room which it has reached by the progressive movements previously described. Preferably, however, some time may be saved by drawing the machine back to the left-hand side of the room while the drilling of the newly-cut zone is being done. Thus the machine will be in position to start a new loading and cutting cycle as soon as the shooting has been done—that is, it will be back in the starting position for the next advanced zone as shown in Fig. 5.

In Fig. 7 operation of the invention is shown applied to the driving of a cross-cut from a room. As here shown this operation is taking place after the end of the room has been reached and the withdrawing of the pillar formed by the left-hand rib is about to start. However, a similar operation would be performed in making any cross-cut to the side from an advancing room.

As will be clear from the drawings, the successive positions of the mechanism in Fig. 7 are substantially similar to those shown and described in connection with Fig. 4. The particular differences in Fig. 7 are that the direction of advance is at right angles to the original rope lines so that the semi-circular platform 450 is employed, while the loading movements of the skip about the circular platform are counterclockwise in direction instead of clockwise. The successive movements of the cutting machine and of the skip to load out the successively-cut and shot-down areas between the walls formed by the termini of the arcuate cuts will be obvious from the legends on the drawings.

Figure 8:
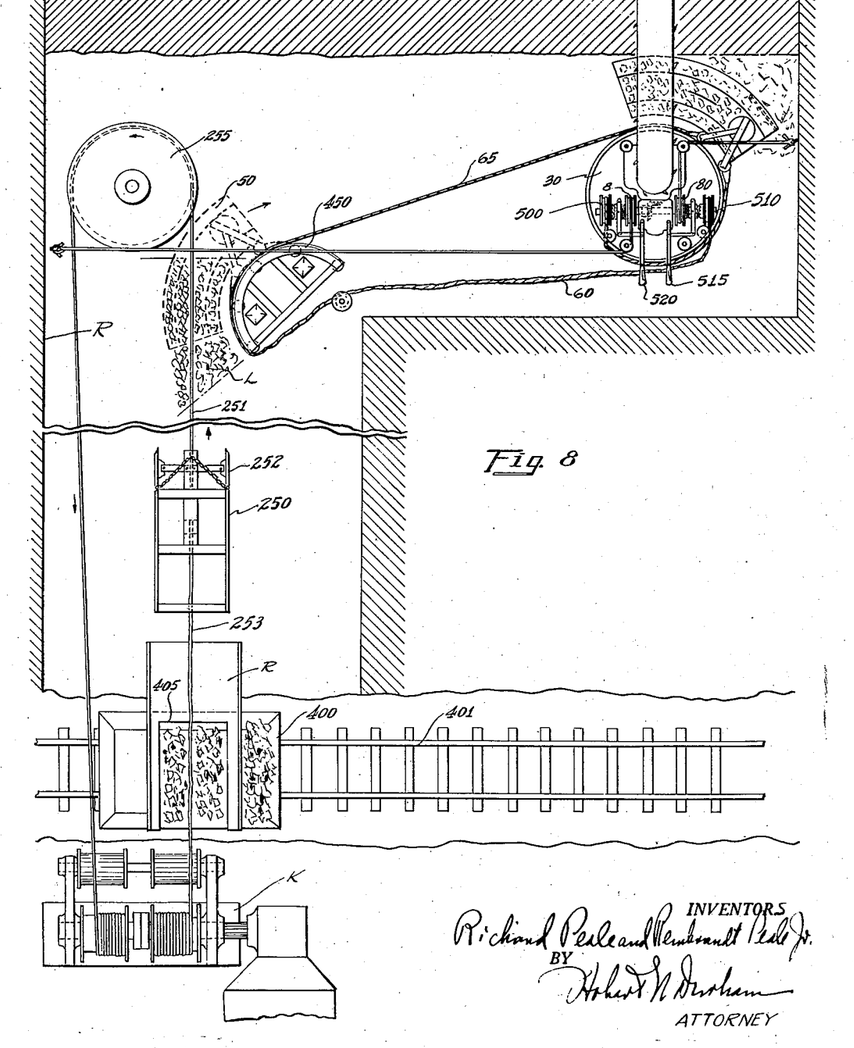
Fig. 8 is a diagrammatic plan view of a modified form of the invention providing for a short and substantially constant length of travel of the loading skip away from and toward the cutting machine.

A modified application of the invention is illustrated in Fig. 8. In this form of the invention a short and relatively constant distance of haul for the arcuate skip is maintained, so that loading out of the shot-down coal from the path of advance of the cutting machine can be conducted expeditiously and at a fairly constant rate so that cutting and loading will progress rapidly. When the arcuate skip 50 is used to convey the loaded-out coal from the shot-down face to the car at the entry, the distance of travel of said skip varies greatly depending on the position of the face with respect to the entry. That is, the distance of the travel of the skip may vary from a few feet up to 300 ft. or more. When mining operations are conducted at the greater distances, the time consumed in moving the loaded skip from the working face to the entry is a relatively great part of the loading and cutting cycle because the cutting machine cannot advance to a new position across the face (to position IV in Fig. 6 for example), until the skip has loaded out the coal from the segmental zone 5. Thus the cutting of the kerf from position III to position IV must wait upon the travel of the skip over the round trip of 600 ft., whereas the average such round trip for any position of the apparatus in the mine will be in the neighborhood of 300 ft.

The arrangement shown in Fig. 8 obviates the major portion of such delay and thereby enables the cutting machine to be moved laterally virtually continuously, while the loading and cutting operations are greatly speeded up and the amount of coal loaded out per hour thereby greatly increased. In accordance with this feature of the invention, the skip 50 is not drawn all the way to the entry from the cutting machine, but is caused to travel a relatively short distance to unload and the coal unloaded by it is then picked up by another means of conveyance and delivered to the mining car at the entry. As here shown the skip 50 is caused to deliver its load of coal L at a point near the rib R, so that the maximum travel of the skip from loading position to unloading at point L is that of the width of the face which in practice is usually 40' or less. Thus for this purpose the semi-circular platform 450 is positioned near its normal location along the rib (as in Fig. 6 for example) and the travel of the skip is from the unloading pile L, just beyond or about the periphery of the semi-circular platform 450, back to the circular platform at the cutting machine wherever it may be across the width of the face.

For this purpose the head rope 60 and the tail rope 65 are preferably actuated by power drums located on the cutting machine itself or in the vicinity thereof. As shown in Fig. 8 a drum 500 for the head rope and a drum 510 for the tail rope are mounted on the base 30 of the circular platform about the cutting machine, said drums being driven from the motor 21 of the cutting machine by cross-shafting as indicated. Said shafting is provided as extensions of the driving shaft for the machine rope drums 80 and 81, previously described. By means of suitable clutch controls 515 and 520, either set of rope drums may be operated together or separately as desired so that the skip ropes 60 and 65 may be controlled to advance and withdraw the skip for loading purposes, while at the same time the cutting machine may be advanced to make the next cut in the solid face of coal beyond the shot-down mass as rapidly as the clearing away of the coal by the loading operation will permit. Obviously a very great increase in the speed of the cutting and loading cycles will result.

Any suitable means may be provided for removing loaded out coal from the pile L thereof on the mine floor. As shown a conventional skip 250 adapted to operate on a straight line travel is indicated for this purpose. Said skip is drawn into the pile L by a head rope 251, the gates 252 of said skip at the head end thereof being held open by inward pull of the head rope. When the skip is charged with coal by such inward movement, the pull on the head rope is relaxed and the tail rope 253 is pulled to reverse the direction of the skip, closing the doors and drawing out a load of coal from the pile L. The capacity of this straight line skip 250 may be substantially greater than that of the arcuate skip 50 so that a relatively long haul on the part of the skip 250 will nevertheless enable it to keep pace with the deliveries of coal to the pile L by the skip 50. As shown, the head and tail ropes for the skip 250 are operated from the conventional power drums and driving apparatus K in the entry. A suitable turning drum or rope-guiding sheave 255 will be mounted in appropriate position beyond the pile L and out of the path of delivery movement of the skip 50. A ramp R is conventionally shown at the end of the delivery path of the skip 250 for receiving coal therefrom and delivering same into the mine car 400 on the tracks 401 in the entry. The ramp R may have an opening 405 in its bottom plate for that purpose. It will be understood that the skip 250 preferably has an open bottom and in general may be constructed like that described in Patent No. 1,471,627 to Packer.

This aspect of the invention is not limited to the use of a reciprocable auxiliary skip like that shown in Fig. 8. Any suitable means for conveying loaded out coal L to the entry may be provided, such as a continuous belt conveyor, a shaking or reciprocating conveyor or any other desired form of apparatus for the purpose indicated.

Figure 9:
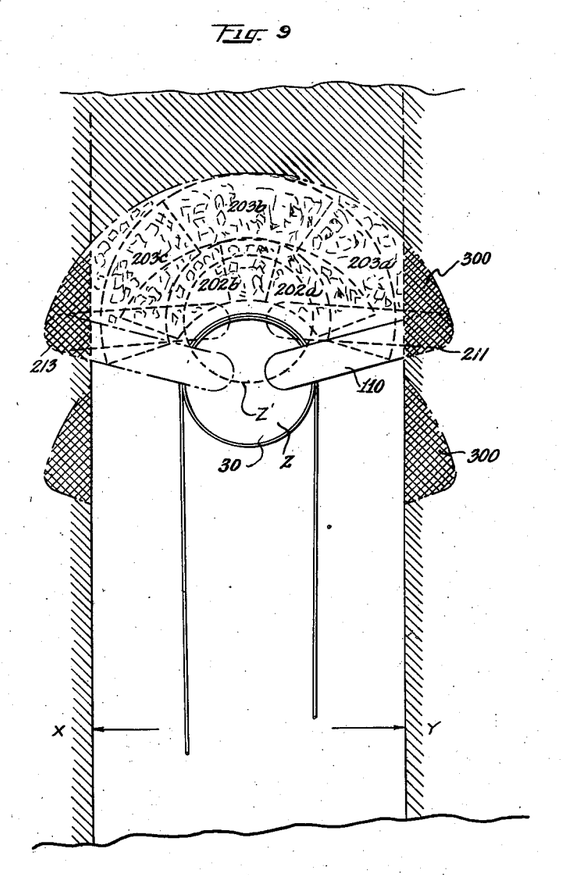
Fig. 9 is a similar diagrammatic view showing a modified form of the invention applying to the cutting of a narrow place or cross-cut.

A somewhat modified operation of the invention is illustrated in Fig. 9, applied to the driving of a narrow place similar to that shown in Fig. 4. In the modified operation contemplated by this aspect of the invention, the loading out of a shot-down mass of coal is completed before cutting the next kerf in the solid face of coal ahead. The cutter bar 10 of the machine is caused to make an arcuate cut through a somewhat greater angle than the net width of the place so that upon completion of the cutting motion the end of the cutter bar may be held beyond one side wall of the place at the limit of its arc. A skip may then be moved around the circular platform 30 at the base of the machine, up to the edge of the cutter bar while so held, so as to provide a narrow place having a predetermined width by loading out all the shot-down coal within the orbit of movement of the skip. By so operating the skip does not pass under the cutter bar and hence it is possible to use a skip of greater capacity, i. e. a skip having a vertical height equal to the distance from the floor to nearly the top of the kerf.

The detailed steps in carrying out this operation are illustrated in Fig. 9. As there shown the cutting machine having the circular base 30 is provided with a cutter bar shown with the machines previously described. That is, cutter bar 110 will preferably extend about 7 ft. beyond the circular peripheral outline of the machine base. Assuming that the effective or desired width of the place is to be the distance XY (that is, a little more than the diameter of the circular machine base, plus twice the radial width of the skip), the cutter bar will be swung to cut an arcuate kerf starting on the line 210 and swinging counter-clockwise to make the arcuate cut on the curve from initial point 211 to final point 213. The coal in this kerf is then shot-down, but the drilling of same is preferably restricted so that the cut portion of coal in the triangular zone or pocket 300 is left intact so that except for the kerfs in said triangular pockets the face of the coal remains intact along the sides of the place. When the arcuate kerf 211—213 has been fully cut, the cutter bar 110 is held in its ultimate position at the limit of the cut, i. e. the point 213, during the loading out of the shot-down coal.

The skip is then brought in to load in the manner previously described around the circular base of the machine in the position Z. The first load will be of the shot-down coal in the arcuate portion 202a, and the next load in the similar portion 202b. Thereupon the cutting machine is advanced straight forward along the center line of the place to the second position, shown in dotted lines and marked Z'. In so advancing the cutting machine, the end of the cutter bar is held at the corner or pocket 213 of the cut so that the cutter bar remains out of the path of movement of the skip during the subsequent loading operations. Said operations are then effected by successive movements of the skip about the base of the machine in position Z' to load out the arcuate segments 203a, 203b and 203c. All the coal having thus been loaded out, the skip is withdrawn, the cutter bar swung back to the right in the clockwise direction and the machine advanced sufficiently to make a second arcuate cut employing again substantially the full length of the projecting portion of the cutter bar 110.

By these operations it will be clear that a narrow place can be rapidly cut and loaded out by merely advancing the cutting machine in successive steps along the center line of the place while the loading and cutting operations are performed about the circular base of said machine in such successive positions. The added capacity of the higher skip in driving such a narrow place will be substantial inasmuch as this modified operation requires fewer changes of position on the part of the machine during the cutting and loading of a given quantity of coal.

Figures 10, 11:
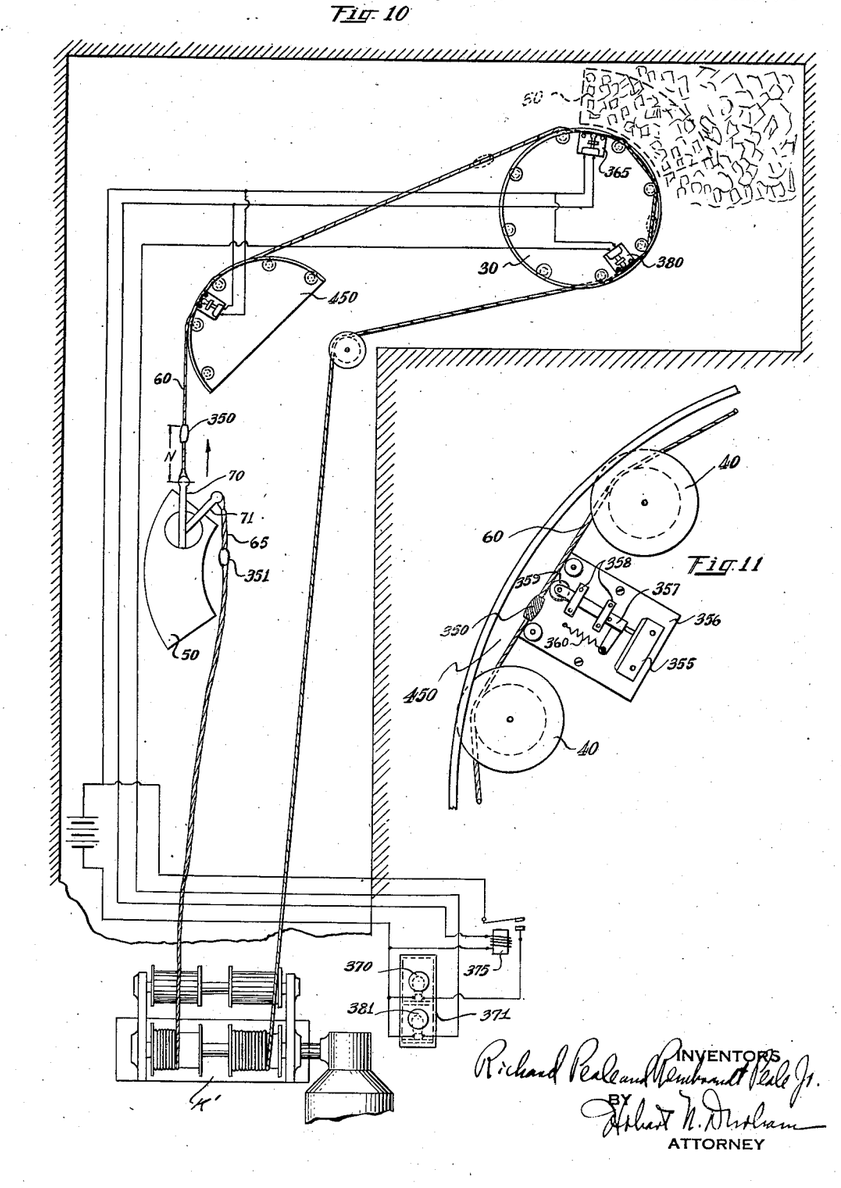
Fig. 10 is a diagrammatic plan view of a signalling system used in connection with the invention.
Fig. 11 is an enlarged fragmentary detail of the switching mechanism employed in connection with said signalling system.

In Figs. 10 and 11 there is shown means for giving signals to the operator of the hoist for the skip cables so that he may know when the skip is approaching contact with the circular platform 30 and the semi-circular platform 450. This information is helpful to the hoist operator so that he may slow down the skip just before it makes contact with the arcuate surfaces of said platforms and thereby minimize the shock of impact. In the preferred embodiment a signal-actuating sleeve or button 350 is formed or mounted on the head rope 60. Said sleeve is somewhat oval in cross-section so as to substantially increase the thickness or diameter of the cable at that point and thereby act as a cam to actuate a switch as subsequently described. The sleeve 350 is positioned on the head rope at an appropriate distance N from the end of the head arm 70, said distance being calculated as sufficient to give the operator time to slow down the skip sufficiently before the arm 71 strikes the adjacent surface of the circular or semicircular platform. A similar sleeve or signal-operating cam button 351 is positioned on the tail rope 65 at a similarly appropriate distance N' from arm 71 of the skip to which said rope is attached.

Referring to Fig. 11, means are provided whereby the passage of sleeve 350 past a predetermined locus on the half-wheel 450 is caused to actuate a signal-operating switch 355. Said switch (preferably a simple micro-switch) is mounted on a suitable panel 356 positioned in a horizontal plane between two cable-guiding sheaves 40 on said semi-circular platform. The switch is adapted to be actuated by a plunger 357 reciprocally mounted in brackets 358 on the panel 356. Said plunger has a roller 359 on its end remote from the switch. The plunger is normally held away from contact with the switch by a suitable spring 360 and in said normal position the roller 359 of the plunger lies just clear of the normal line of passage of the cable 60 (or 65 as the case may be), when same is under tension and being drawn about the surface of the semi-circular or circular platform. As shown in Fig. 11, when said cable is so under tension, it forms a chord with respect to the circular outline of the platform between its points of contact at the peripheries of the two sheaves 240. The thickness of the sleeve 350 on said cable is such that it will come in contact with and push the plunger against the spring to operate the micro-switch as will be obvious.

When the head cable 60 is pulling the skip toward the semi-circular platform 450 (or the circular platform 30 which has a similar switch mechanism) the passage of the sleeve 350 past the switch plunger will cause said switch to close and thereby impart a signal to the operator (by means hereinafter described) at a predetermined time in advance of the contact of the skip arms 71 and 70 with the curved bearing surface of the platform.

As stated, a similar switch mechanism, to be actuated by sleeve 350, is positioned at 365 on the circular platform 30. It will be understood that when the tail rope passes by said switches, the sleeve 351 thereon will not actuate said switches unless said tail rope is under tension and the same is true of the head rope. Consequently the switches will be actuated only when the particular direction of movement of the skip is apparent to the hoist operator.

The invention provides a signal light 370 mounted in a suitable box 371 adjacent the station of the hoist operator at the hoist unit K' in the entry. Said light is on a circuit with regard to which the two switches 355 and 365 are in parallel so that the light is energized by the closing of either switch. A suitable delayed action relay 375 is provided in said circuit to hold on the light for a short time after either switch is actuated.

In some cases it also may be desirable to give the hoist operator another signal, indicating to him when the skip has travelled inwardly about the circular platform 30 to the maximum extent desired—that is, until its head end has reached a point beyond which it is not safe for it to travel farther. For this purpose a similar switch 380 may be formed beyond such point on the periphery of the circular platform, same to be actuated by the sleeve 350 of the head rope as previously described. A suitable separate circuit is shown for the cooperation of said switch in energizing a separate signal light 381.

Figure 12:
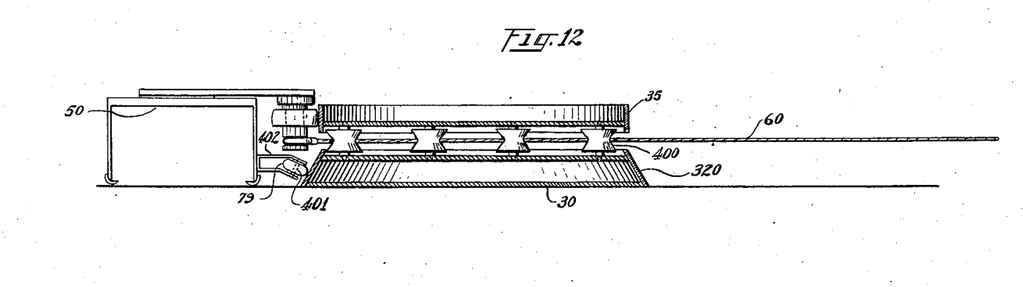
Fig. 12 is a vertical section of a modified form of circular guiding platform and skip.
Figure 13:
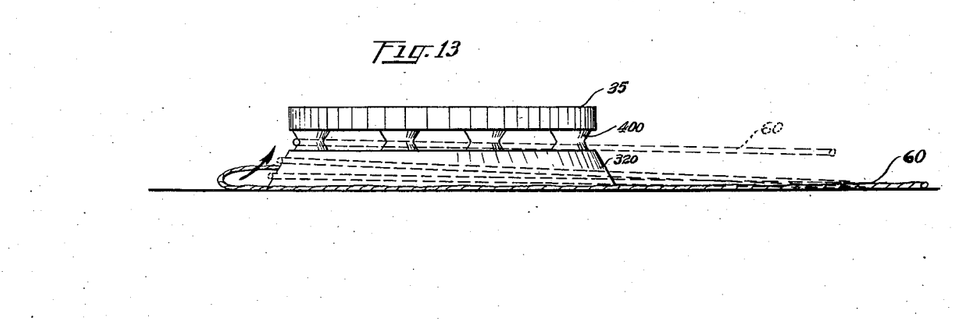
Fig. 13 is an operational view similar to Fig. 12.

Fig. 12 illustrates a modified form of construction for the lower portion of the circular platform 30, wherein the normally vertical lower bearing wall 32 thereof is inclined upwardly and inwardly, as indicated by the numeral 320. In this form of guiding platform, the sheaves 400 are also preferably shown as grooved. These modifications are found desirable in preventing the skip cables from sliding or falling away from contact with the guiding sheaves on the platform when such cable is slack. As shown, the inclination of the lower guiding track 320 tends to force the cable inwardly and upwardly and into the grooved sheave whenever sufficient tension is applied to the cable drawing it toward the periphery of the circular platform. Fig. 13 illustrates various positions which said cable may assume in travelling around the platform and indicates how the inclination of the lower portion of said platform facilitates its recovery.

In order to enable the skip to have suitable bearing contact with said lower inclined wall 320 of the platform, the lower rollers 79 on the skip are mounted on suitably inclined axles 401 held in appropriately-formed brackets 402 as shown in Fig. 12.

The invention in its broader aspects is not limited to the specific mechanisms shown and described but departures may be made therefrom within the scope of the accompanying claim without departing from the principles of the invention and without sacrificing its chief advantages.

What we claim is:

Apparatus for mining coal including in combination a kerf cutter bar having a supporting base, said cutter bar being of such length that it will extend into and cut a kerf of substantial depth when the machine base is positioned adjacent a mass of coal shot down from a previously cut kerf, a coal-loading skip movable toward the base and along same into said mass of coal for loading and movable along and away from said base for conveying away coal from said shot-down mass, and means for so moving the skip relative to the base and cutter bar when same are positioned as aforesaid, whereby the skip is capable of loading out shot-down coal lying between the machine base and the solid face of the coal while a fresh kerf is being cut in said solid face.

RICHARD PEALE.
REMBRANDT PEALE, Jr.